Figure 1:
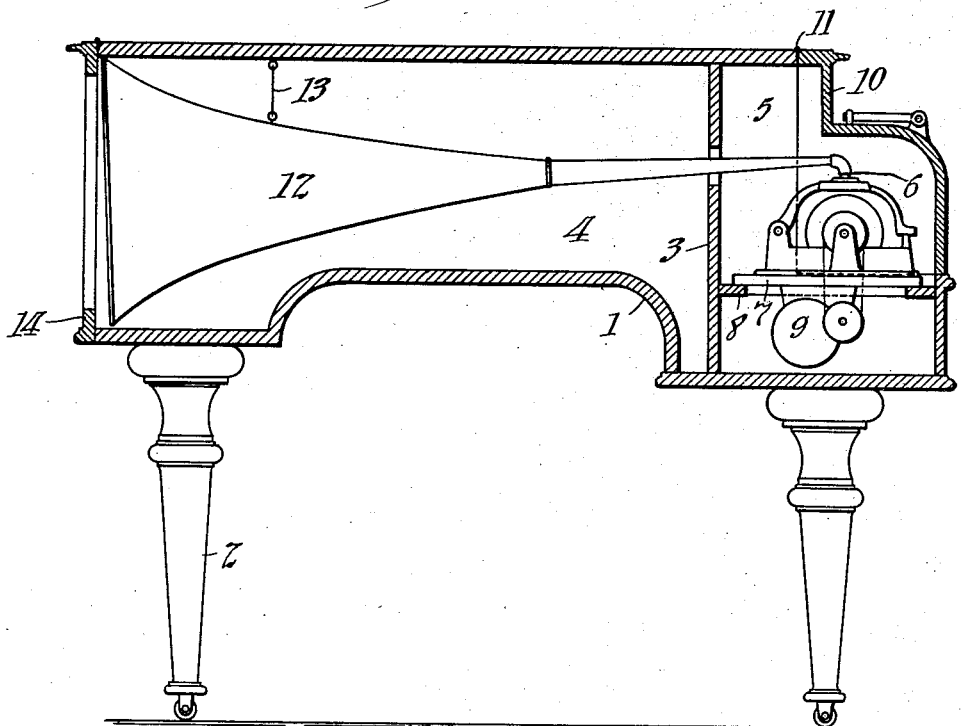

T. A. EDISON.
PHONOGRAPH.
APPLICATION FILED AUG. 12, 1909.

1,050,355.

Patented Jan. 14, 1913.

2 SHEETS—SHEET 1.

Witnesses:

Inventor:
Thomas A. Edison

T. A. EDISON.
PHONOGRAPH.
APPLICATION FILED AUG. 12, 1909.
1,050,355.
Patented Jan. 14, 1913.
2 SHEETS—SHEET 2.
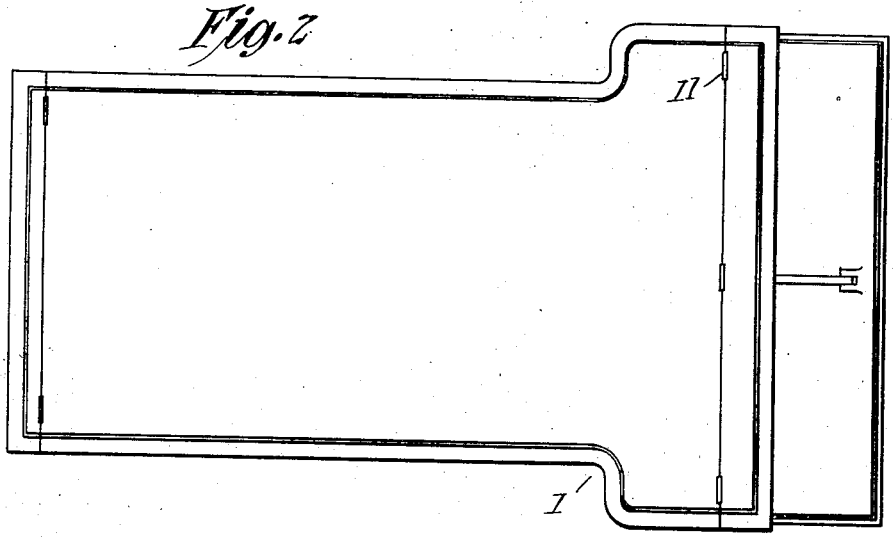
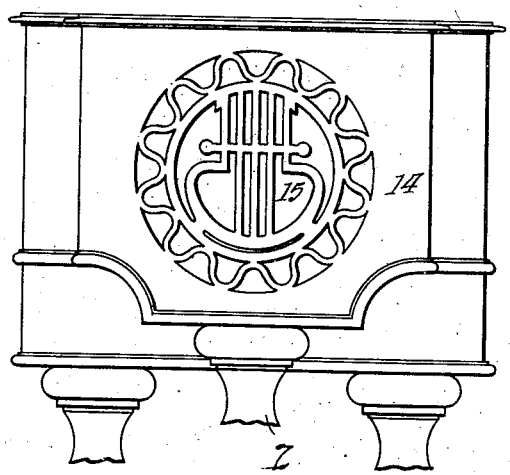
Witnesses:
Inventor:
Thomas A. Edison

UNITED STATES PATENT OFFICE.

THOMAS A. EDISON, OF LLEWELLYN PARK, WEST ORANGE, NEW JERSEY, ASSIGNOR TO THOMAS A. EDISON, INCORPORATED, OF WEST ORANGE, NEW JERSEY, A CORPORATION OF NEW JERSEY.

PHONOGRAPH.

1,050,355.　　　　Specification of Letters Patent.　　Patented Jan. 14, 1913.

Application filed August 12, 1909. Serial No. 512,579.

*To all whom it may concern:*

Be it known that I, THOMAS A. EDISON, a citizen of the United States, and a resident of Llewellyn Park, West Orange, county of Essex, and State of New Jersey, have made a certain new and useful Invention in Phonographs, of which the following is a description.

My invention relates to phonographs and particularly to phonographic reproducing apparatus of the so-called "hornless" type, or that type in which the horn or sound conveying means is entirely inclosed and hidden from view.

Among the objects of my invention are the production of an improved apparatus of this character wherein the horn or sound conveying means is suspended in an approximately horizontal plane and is forwardly directed from the neck of the reproducer. This sound conveying means is inclosed within a casing which is also forwardly directed in an approximately horizontal position from the reproducer, which is also inclosed. The horn inclosing chamber is constructed preferably of wood.

Reference is hereby made to the accompanying drawings forming part of this specification, embodying a preferred form of my invention, and in which—

Figure 1 represents a side elevation of an apparatus embodying my invention, the casing being shown in cross section; Fig. 2 represents a plan view of the same; and Fig. 3 represents a front view looking from the left in Fig. 1.

Corresponding parts are denoted throughout by the same reference numerals.

Referring to the drawings, the casing, represented as a whole by the numeral 1, is mounted upon legs or supports 2, of which there is preferably one at the forward end and two at the rearward end. The vertical partition 3 divides the casing 1 into a forward or horn inclosing chamber 4 and a rearward or reproducer inclosing chamber 5. The reproducer 6, mounted upon the base plate 7, is supported within chamber 5, the base plate 7 resting upon shelf 8 therein. The motor 9 suspended below base plate 7 is entirely below the shelf 8 within the chamber 5. Access may be had to the reproducer and the interior of the chamber 5 by means of the hinged cover 10, pivotally supported by hinges 11.

The horn or sound conveying means 12 is forwardly directed from reproducer 6, the small end of the horn being attached by the usual connection to the neck of the reproducer, and the horn extending through an opening in vertical partition 3. The horn or sound conveyer is entirely inclosed within the walls of chamber 4, the horn 12 being suspended therein in any convenient manner, as by means of the supporting link 13 attached to the under side of the upper wall of the chamber. The forward end of the horn, which preferably is bell shaped, is immediately behind the front wall 14 of the horn inclosing chamber. This front wall is provided with an opening through which the sounds conveyed by horn 12 may emanate, this opening being preferably provided with the grille work 15 or equivalent device which serves the function of largely hiding the inclosed horn, while at the same time, it does not interfere noticeably with the volume of sound passing therethrough.

The structure is of a pleasing appearance, and permits the suspension of the sound conveying means in an approximately horizontal position, whereby the loss of volume due to bends in the horn is prevented, while, at the same time, the advantages of the concealed horn are retained.

Having now described my invention, what I claim and desire to protect by Letters Patent is as follows:

In a phonograph, the combination with a reproducer, of a sound conveying horn forwardly directed therefrom without bend in an approximately horizontal direction, a casing comprising a chamber in which said reproducer is supported and inclosed, said chamber having a hinged cover, and a chamber inclosing said horn and extending in an approximately horizontal direction from said reproducer chamber, a vertical partition fixed in the casing for separating said chambers and having an opening therein for the horn, a horizontal shelf in said reproducer chamber dividing the same into upper and lower parts and on which shelf said reproducer is supported and below which the reproducer motor is positioned and means for suspending said horn from said casing for pivotal movement about a substantially vertical axis adjacent the outer end of said horn inclosing chamber, substantially as described.

This specification signed and witnessed this 7th day of August 1909.

THOS. A. EDISON.

Witnesses:
DYER SMITH,
ANNA R. KLEHM.